Jan. 8, 1935.  C. E. TIMSON  1,986,902
IDENTIFICATION TAG
Filed May 31, 1934
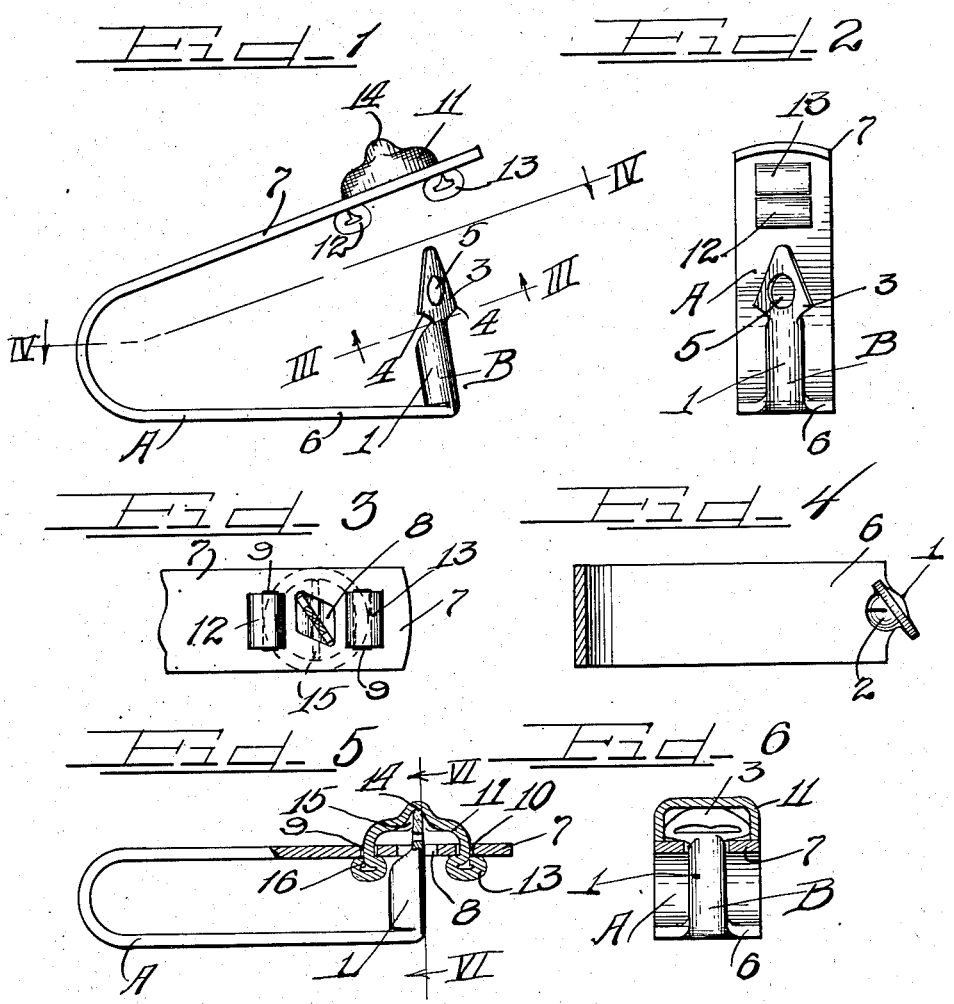

Patented Jan. 8, 1935

1,986,902

UNITED STATES PATENT OFFICE 1,986,902

IDENTIFICATION TAG

Charles E. Timson, Deerfield, Ill., assignor to William Cooper & Nephews Inc., Chicago, Ill., a corporation of Illinois Application May 31, 1934, Serial No. 728,196

10 Claims. (Cl. 40—3)

The present invention relates to identification tags which may be permanently sealed and applied to articles and things, and which, when applied, offer no uneven or projecting parts to damage the articles to which attached, or to become caught in foreign matter thus hazarding accidental removal. The invention further contemplates an identification tag which may be applied to an animal, preferably through its ear, and so constructed that when once applied, it cannot be removed without breaking some part of the tag. The invention also contemplates the provision of an identification tag for application to an animal so constructed as to form no uneven or rough edges or parts for irritating the animal.

The present invention has to do with an identification tag which may be economically manufactured, easily attached by anyone and so constructed as not to be removable without necessitating the breaking of some part of the tag to effect such removal.

The identification tag of the present invention is of the type fashioned from a strip of metal forming two arms, the end of one of which is fashioned to provide a prong or pointed part and the other of which is provided with an aperture or recess through which the pointed part is passed and then fixed to permanently connect together the ends of the strip in such manner as to prevent removal without breakage of the tag.

An object of the present invention is to provide an identification tag or marker which will cut its own hole when applied and which, when applied, is fastened permanently and so interlocked that it cannot be removed without destruction of some part of the tag thus preventing fraudulent removal and reuse.

Another object of the invention is to provide an identification tag with a prong having a head which is twisted when applied, for interlock, to prevent removal of the tag without destruction of the same.

A further object of the invention is to provide an identification tag having a part which is adapted to be thrust through an article to be tagged, and constructed with a head which is twisted and deformed for interlocking the parts that are applied, together, against fraudulent and accidental removal. A still further object of the invention is to provide, in an identification tag of the type herein considered, a prong so formed that, when applied, no rough or sharp parts irritate or injure an animal to which the tag may be applied.

A yet further object of the invention is to provide an identification tag having a cap covering a prong aperture, which cap is so applied as to present no rough or sharp parts for irritating or injuring an animal to which the tag may be applied.

The above other and further objects of the invention will be apparent from the following description, accompanying drawing, and appended claims.

Tags of the present invention may be used for ear markers for cattle, for marking hides, or other articles or things, and may as well be used for permanent markers in connection with inanimate things, where it is desired to have the things identified and marked and the tags so applied as to prevent fraudulent removal.

Generally speaking the invention contemplates an identification tag formed of a strip of metal having a prong at one end, and adjacent the other end a covered aperture through which the pointed part is forced and therein twisted and clinched, to permanently interlock together the ends of the strip in a manner to prevent unlocking or removal of the tag without having to break some part of it.

An exemplification of the present invention is illustrated in the accompanying drawing and the views thereof are as follows:

Fig. 1 is a side elevational view of an identification tag constructed in accordance with the principles of the present invention, and showing the tag in position to be applied to an article, such as the ear of an animal, a hide, a rug, or other item.

Figure 2 is an end view of the tag of Figure 1 looking at the righthand end of the figure.

Figure 3 is a fragmental sectional view taken substantially in the plane indicated by the line III—III of Figure 1.

Figure 4 is a sectional view taken substantially in the plane indicated by the line IV—IV of Figure 1.

Figure 5 is a view, partially in side elevation, and partially in section, of the tag of Figure 1 shown with the ends connected together in interlocked relation, and Figure 6 is a vertical, sectional view taken substantially in the plane indicated by the line VI—VI of Figure 5.

The drawing will now be explained:

The tag chosen to exemplify the present invention comprises a metal strip A having formed, out of the material of the strip, a prong, designated generally as B.

The prong B comprises a body portion 1 which is fashioned by bending the material forming it into substantially cylindrical shape and closing the upper end of the body, in rounded formation as shown at 2 in Figure 4, and a piercing tip 3 which is flat and pointed, providing shoulders 4 extending on opposite sides of the mid-length of the prong, which in extent are greater than the transverse dimension or diameter of the body 1. The tip 3 is provided with an aperture 5, for the purpose of weakening the tip, for a purpose to be later explained.

The portion of the tag, carrying the prong B, is, for convenience herein, designated arm 6 and the other arm is designated as 7.

The arm 7, near its extremity, is provided with an opening or aperture 8 herein shown as elongated, with its direction of greater length extending obliquely across the arm 7 of the tag.

Each side of the opening 8 are apertures 9 and 10 respectively.

For overlying the opening 8 on the outer or exposed surface of the arm 7, a cap 11 is provided. The cap 11 is fashioned from metal and is provided with lugs 12 and 13 for entering the apertures 9 and 10 respectively in the arm 7. The cap 11 is further provided with an offset part 14 to provide in the interior of the cap a depression or groove 15. The direction of the length of the depression or groove 15 is out of parallelism with the greater dimension of the opening 8, while the plane of the groove 14 intersects the plane of the greater length of the opening 8.

The cap 11 is applied to the arm 7 by passing the lugs through the apertures 9 and 10 in the arm, the ends of which lugs are then subjected to suitable action to roll or crimp the same so that the free ends thereof, designated as 16, may be inturned and disposed in position as not to irritate or fret an animal to which the tag may be applied.

The prong B as before stated, has its body portion 1 constructed substantially in cylindrical form with its upper end rounded, as at 2, to remove the possibility of the formation of rough edges or points at the end of the body portion, to fret or irritate an animal to which the tag may be applied.

The plane of the piercing tip 3 is substantially coincident with the plane including the greater length of the opening 8, that is to say, in the formation of the prong B the piercing tip 3 is twisted so as to lie in some position other than directly transversely of the arm 7 of the tag.

In applying the tag to the ear of an animal, or other object, by use of a suitable tool, the ends of the arms 6 and 7 are forced together so that the piercing tip 3 makes its own hole through the ear or other article and then enters the opening 8 in the arm 7.

The distance between the bottom of the groove 15 and the plane of the opening 8 is less than the height or length of the piercing tip 3 so that as the piercing tip 3 is forced home within the cap 11, the same is deformed, by pressure applied by the tool, thereby mashing and widening the piercing tip after passing through the opening 8. As the piercing tip 3 encounters the depression or groove 15 in the cap 11, because of the different angular relationship between the plane of the tip and the direction of the length of the groove, the tip on engaging the groove will be twisted into more or less coincidence with the direction of the length of the groove, and out of the plane of the longer dimension of the opening 8, so as to bridge the opening, within the cap 11, and thus prevent withdrawal of the tip through the opening 8.

The deformation or mashing of the piercing tip 3, in the manner stated, causes application of pressure thereto so that the shoulders 4 thereof bear tightly against the margins of the opening 8, inside of the cap 11, and thus firmly interlock together the ends of the arms of the tag.

The rounded end 2 of the body 1 of the prong B, will limit penetration of the piercing tip 3 into the cap 11 through the opening 8 in the arm 7 of the tag.

The piercing tip 3 is pointed, as stated, so as to readily penetrate the ear of an animal or other object to which the tag is to be applied, and by reason of the formation of the piercing tip, cuts its own hole as it is forced through the article.

The shape of the opening 8 is herein illustrated as being diamond shaped, with one diagonal greater than the other. The shape and size of the opening is optional, of course, and may be as desired to accommodate the particular form, shape and size of the piercing tip 3 and at the same time so fashioned as to cooperate with the closed end 2 of the prong B to limit penetration of the piercing tip through the article to which the tag may be applied.

The twisting and deformation of the piercing tip 3 firmly interlocks the ends of the tag together against accidental removal and prevents fraudulent removal of the tag from its article, without breaking some part of the tag, thus preventing reuse of the tag and assuring its permanency in use.

The present invention provides an identification tag with interlocking of the ends of the tag in such manner that some part of the tag must be broken to remove it from its applied article.

The piercing tip 3 may be reduced in thickness as desired, to assure its readily cutting through an article with minimum damage and also so that it may be easily deformed or mashed within the cap. The piercing tip does all of the cutting necessary to apply the tag to an article and none of the part of the prong below the shoulders 4 of the piercing tip enters the hole or opening in the article, made by the piercing tip, as it is forced through the article.

The tag is applied to an article by bringing it over the article and then forcing or thrusting the piercing tip 3 through the article and then into the opening 8 in the arm 7, thence into the cap 11 whereupon continuous pressure twists the piercing tip within the cap and at the same time mashes or deforms it, to provide an enlargement so that the tip bridges the opening and in addition is mashed or deformed to increase its size and thus effectively lock together the ends of the tag and prevent fraudulent removal of the tag from an article.

The invention has been described herein more or less precisely as to details, yet it is to be understood that the invention is not to be limited thereby, as changes may be made in the arrangement and proportion of parts and equivalents may be substituted, without departing from the spirit and scope of the invention.

The invention is claimed as follows:

1. A metal marker or tag adapted to have one end thrust through an article to be tagged and then interlocked with the other end of the tag, said one end having a weakened piercing tip which is deformable after engagement with the other end of the tag, said other end being provided with means engageable by the piercing tip as the same is forced into engagement with said other end for preventing curling of the tip within the tip engaging means and for foreshortening and transversely enlarging the tip to provide an interlocking enlargement thereof precluding separation of the tag ends without breaking the tag.

2. A metal marker or tag adapted to have one end thrust through an article to be tagged and then interlocked with the other end of the tag, said one end having a piercing tip of greater width than thickness, and said other end having an opening in it to receive said tip to connect said ends, and means on said other end engageable by said tip for twisting said tip after it enters said opening to cause said tip to bridge said opening for interlocking said ends together.

3. A metal marker or tag adapted to have one end thrust through an article to be tagged and then interlocked with the other end of the tag, said other end having an opening in it, said one end having a piercing tip on it, a cap overlying said opening and engageable by said tip as the same is forced through said opening, said cap being provided with means engageable by said tip as said tip is forced through said opening for twisting said tip to bridge said opening and serving as an abutment to prevent advance of said tip after a portion thereof has entered said opening whereby pressure applied to said tip to force it home causes widthwise enlargement of the tip to interlock it with said other end and to compress said tip between said cap and the margins of said opening.

4. A marking or sealing tag comprising a bent metal strip having one end sharpened and weakened to provide a piercing tip and having near its other end a cap covered opening for receiving the piercing tip, the distance between said opening and the part of the cap contacted by said tip being less than the length of the tip which is forced through said opening whereby said tip is mashed and deformed within said cap, said cap having a groove in it which is engaged by the extremity of said tip and which is disposed with its length out of parallelism with said tip so as to twist said tip to bridge said opening as it is forced into said cap, the twisting and deformation of said tip in the manner stated preventing separation of the tag ends without destruction of the tag.

5. An identification tag comprising a bent metal strip having a prong at one end to be thrust through an article for engaging the other end to interlock said tag in applied position, said prong being formed from a part of one arm of said strip and having a body and piercing tip, said body being substantially cylindrical with the portion thereof adjacent the tip being rounded to eliminate rough edges, and the tip being flat and pointed and forming shoulders adjacent the body of greater extent than the body diameter.

6. A cattle tag bent from a piece of metal and fashioned to provide a tipped prong at one end and with its other end provided with an elongated opening to receive said tip, said tip being flat and pointed and having a base of greater extent than the body of the prong, a cap covering said opening along one side of said other end and having a groove in it extending in a direction out of parallelism with said opening to receive said tip when the same is forced through said opening and twist said tip so that its base bridges said opening and thus interlocks with said other end.

7. An identification tag of metal fashioned from a single piece of metal bent into substantially U-shape to provide two arms, one of said arms being bent to provide a prong extending toward said other arm, said prong having its extremity flattened and pointed to form a piercing tip, the other of said arms having an elongated opening in it to receive said tip in register with said tip, a cap covering said opening on the side of said other arm remote from said prong, said cap having an elongated recess formed in it out of parallelism with said opening and intersecting the plane thereof, said recess being engaged by said tip as said arms are forced together whereby said tip is twisted out of register with said opening to bridge said opening for interlocking said ends together.

8. An identification tag having cooperating slot and prong means for securing the tag in place and means for twisting the tip of said prong after entering into said slot to cause said tip to lie crosswise of said slot for preventing separation.

9. An identification tag having cooperating slot and prong means for securing the tag in place and means for twisting the tip of said prong after entering into said slot to cause said tip to lie crosswise of said slot for preventing separation, and for foreshortening said tip as it is being twisted.

10. A cattle marker comprising a metal tag having cooperating slot and prong means for securing the tag in place, said prong having a piercing tip on it, and means for twisting and mashing said tip as it is forced through said slot to interlock said tag in place.

CHARLES E. TIMSON.